Figure 1:
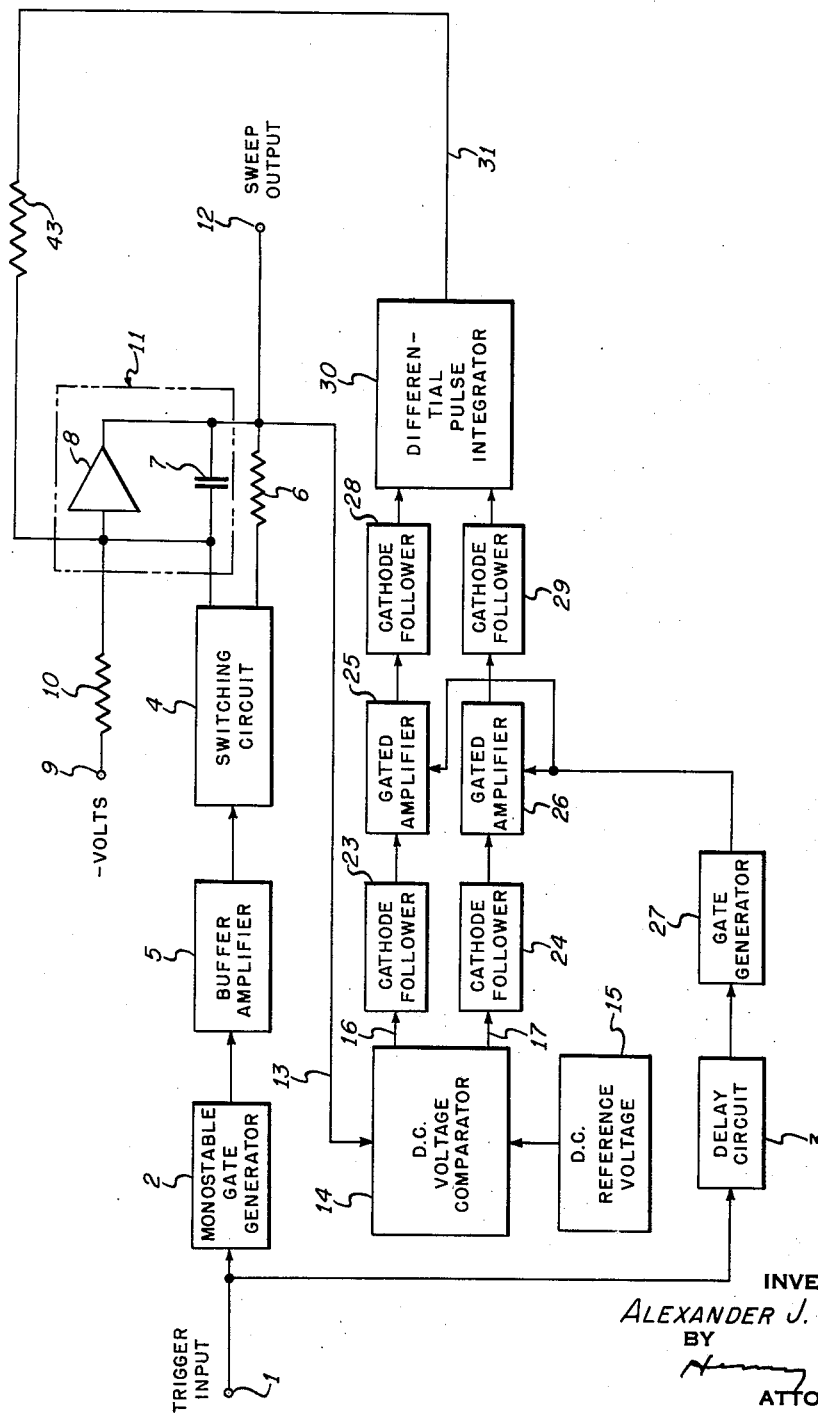

May 8, 1962 A. J. BARGESKI 3,034,061
SELF-REGULATING SWEEP GENERATOR
Filed Sept. 12, 1960 2 Sheets-Sheet 1

INVENTOR
ALEXANDER J. BARGESKI
BY
ATTORNEY

May 8, 1962  A. J. BARGESKI  3,034,061
SELF-REGULATING SWEEP GENERATOR
Filed Sept. 12, 1960  2 Sheets-Sheet 2

INVENTOR
ALEXANDER J. BARGESKI
BY
ATTORNEY

United States Patent Office 3,034,061
Patented May 8, 1962

3,034,061
SELF-REGULATING SWEEP GENERATOR
Alexander J. Bargeski, Levittown, N.Y., assignor to Sperry Rand Corporation, a corporation of Delaware
Filed Sept. 12, 1960, Ser. No. 55,473
6 Claims. (Cl. 328—35)

The present invention generally relates to sweep waveform generators and, more particularly, to a linear sweep generator adapted for the automatic self-regulation of sweep slope.

The problem of maintaining a predetermined slope characteristic in a linear sweep waveform is of particular concern in precision computer applications. One proposed solution to this problem contemplates the selective matching of the temperature coefficients of the slope determining elements of the sweep generator. For example, in a generator of the resistance-capacitance type, the resistive and capacitive elements may be selected to have compensating temperature coefficients whereby the slope of the generated waveform tends to remain substantially constant irrespective of environmental temperature ambients. Alternatively, the entire sweep generator may be enclosed in a temperature stabilizing oven. The aforementioned techniques, however, do not take into account changes in the values of the sweep slope determining elements attributable to effects other than temperature change. It is well recognized that normal aging, for example, of the circuit elements may alter the normal values thereof.

It is the principal object of the present invention to provide an improved linear sweep generator for producing a sweep waveform having a slope that remains at a predetermined value substantially independent of changes in the values of the slope determining circuit elements.

Another object is to provide a linear sweep generator for producing a sweep waveform of substantially constant slope independent of environmental effects which tend to alter the values of the slope determining circuit elements.

A further object is to provide a sweep generator adapted for the automatic self-regulation of the slope of the generated sweep waveform.

These and other objects of the present invention, as will appear from a reading of the following specification, are accomplished in a preferred embodiment by the provision of a conventional triggered sweep generating circuit. The generated sweep waveform is applied to a voltage comparator circuit of a differential amplifier type to which a fixed amplitude reference voltage is also applied. Two output waveforms are derived from the comparator circuit. Each output waveform has a respective, nominally constant voltage level except for a relatively brief time interval during which the value of the generated sweep waveform traverses the value of the reference voltage. When the sweep waveform and reference voltage values are equal, the amplitudes of the two output waveforms are also equal to each other. The original nominal amplitudes of the two output waveforms interchange after the value of the sweep waveform passes through the value of the reference voltage.

The two output waveforms from the voltage comparator are sampled simultaneously at a predetermined time following the initiation of the triggered sweep waveform. The difference between the amplitudes of the sampled output waveforms is indicative of the deviation between the time of sampling and the time that the value of the sweep waveform equals the value of the reference voltage. The sampled output waveforms are applied to a differential pulse integrator which produces an essentially direct current having a polarity representative of the aforementioned time deviation and an amplitude representing the magnitude of said time deviation. The direct current output of the differential pulse integrator is applied to the slope determining elements of the sweep generating circuit so as to reduce said time deviation toward zero.

Figure 2:
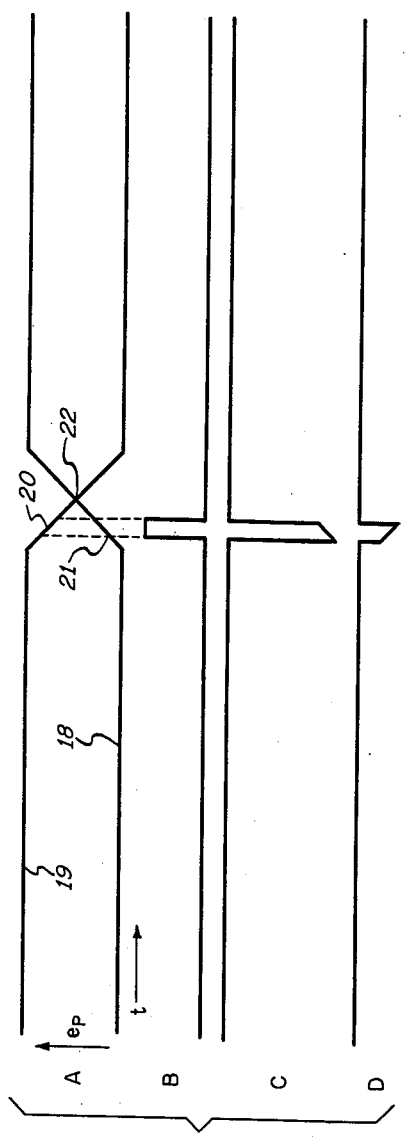
Figure 3:
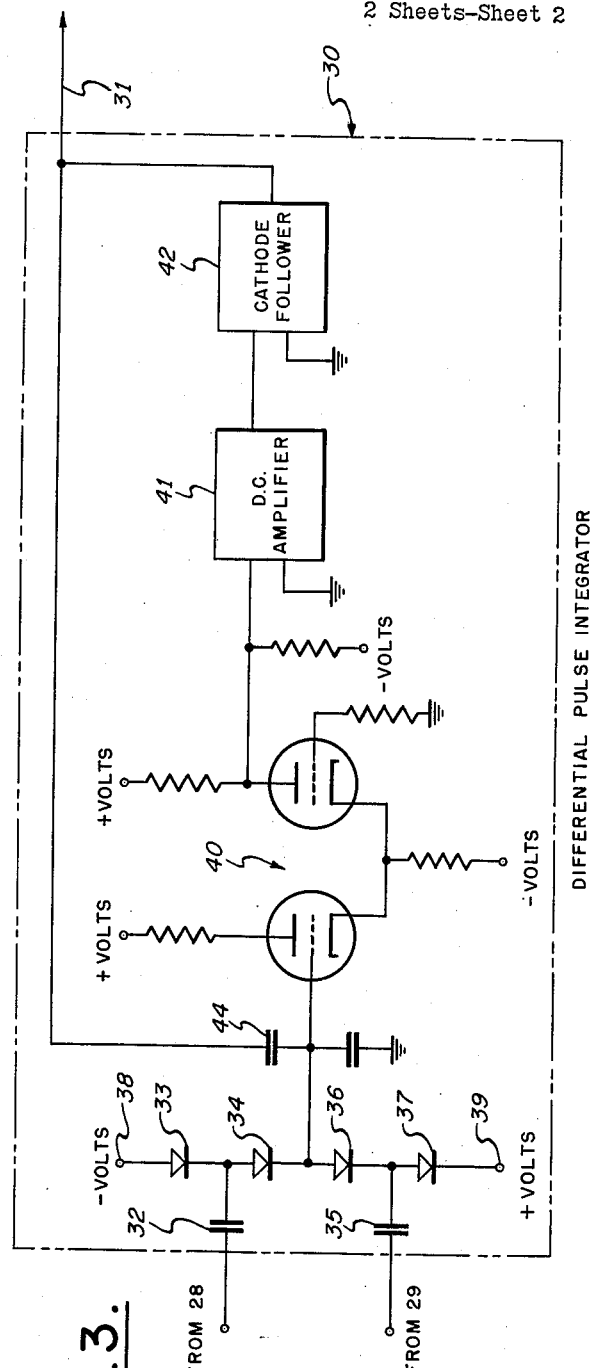

For a more complete understanding of the present invention, reference should be had to the following specification and to the appended figures of which:

FIG. 1 is a simplified block diagram, partially schematic in form, of a preferred embodiment;
FIG. 2 is a series of waveforms useful in explaining the operation of the apparatus of FIG. 1; and
FIG. 3 is a schematic representation of a differential pulse integrator for use in the embodiment of FIG. 1.

Referring to FIG. 1, a source (not shown) of repetitive pulse trigger signals is coupled to input terminal 1. The pulse triggers are jointly applied to monostable gate generator 2 and to delay circuit 3. Each trigger pulse actuates generator 2 to produce an output pedestal waveform having a leading edge concurrent with the initiating trigger pulse and a trailing edge occurring a predetermined time thereafter. The pedestal waveform is applied to switching circuit 4 via buffer amplifier 5. Switching circuit 4 may be a conventional electronic gating circuit connected to function as a nominally closed single pole single throw switch which, when closed, connects resistor 6 in shunt with capacitor 7. Circuit 4 is actuated by the pedestal output of amplifier 5 to break the connection of resistor 6 across capacitor 7.

Capacitor 7 is the feedback capacitor of a conventional Miller integrator sweep waveform generator 11 further comprising amplifier 8. A source of negative potential is applied to terminal 9 and, via resistor 10, to the input terminal of amplifier 8. Sweep generator 11 produces an output waveform on terminal 12 having a slope determined by the expression $$-\frac{de_0}{dt} = \frac{\text{potential at terminal 9}}{R_{10}C_7}$$

The output sweep waveform is applied via line 13 to a first input terminal of voltage comparator 14. A source 15 of fixed amplitude D.C. reference voltage is applied to the second input terminal of comparator 14. Comparator 14 may be conventional in design such as the double triode discriminator of FIG. 9.44 of Waveforms, Radiation Laboratory Series, volume 19, McGraw-Hill, 1949. In the illustrative case, the sweep waveform of line 13 is applied to the grid of one of the triodes of the discriminator with the reference voltage being applied to the grid of the other triode. The output signals produced by comparator 14 are developed at the plates of the triodes and appear, respectively, on output lines 16 and 17.

FIG. 2A illustrates a typical pair of waveforms which might appear at the respective plates of comparator 14. In the quiescent state when a sweep waveform is not being generated by Miller integrator 11, one of the triodes comprising comparator 14 is conducting while the other triode is cut off. The plate potential of the initially conducting triode is represented by waveform 18; the plate potential appearing at the plate of the nonconducting triode is represented by waveform 19. Following the application of the trigger pulse to terminal 1, a linearly increasing sweep waveform appears on line 13. As the amplitude of the increasing sweep approaches the value of the reference voltage produced by source 15, a shift in conduction takes place between the cathode coupled triodes of comparator 14 with the initially conducting triode becoming nonconductive and the initially nonconducting triode becoming conductive. The shift of conduction is represented by the sloping portions 20 and 21 of waveforms 19 and 18, respectively. The amplitudes of the sloping portions 20 and 21 become equal at point 22 when the amplitude of the sweep waveform of line 13 equals the value of the reference voltage produced by source 15. As the sweep waveform continues to increase in amplitude, the shift in conduction between the triodes of comparator 14 is completed. The output waveforms appearing on lines 16 and 17 are coupled by cathode followers 23 and 24 to gated amplifiers 25 and 26, respectively.

As previously mentioned, each trigger pulse applied to terminal 1 is delayed a predetermined time interval in delay circuit 3. The output of delay circuit 3 actuates gate generator 27 to produce the gating waveform represented by waveform B of FIG. 2. The gating waveform B is applied jointly to gated amplifiers 25 and 26 which act as sampling gates. Upon the actuation of sampling gates 25 and 26 by gating waveform B, the instantaneous amplitudes of output waveforms 18 and 19 of FIG. 2A are sampled and applied, respectively, to cathode followers 28 and 29. In the event that gating waveform B occurs at a time when the amplitude of the sweep waveform of line 13 differs from the value of the reference voltage produced by source 15, then the amplitudes of the sampled signal outputs of amplifiers 25 and 26 are unequal. Such a case is typified by waveforms C and D of FIG. 2 which are produced when gating waveform B precedes the occurrence of a crossover point 22 of waveform A. The negative-going pulse of waveform C results from the sampling of the sloping portion 20 of waveform A whereas the negative-going pulse D results from the sampling of sloping portion 21 of waveform A. The sampled pulse signals C and D of FIG. 2 are applied to the inputs of differential pulse integrator 30. Integrator 30 to produces an essentially direct current compensating signal on line 31 having an amplitude related to the difference in amplitude between pulses C and D of FIG. 2 and having a polarity representing the sense of said difference.

An illustrative differential pulse integrator is represented by the schematic diagram of FIG. 3. Referring to FIG. 3, the negative-going pulse sample at the output of cathode follower 28 is applied via capacitor 32 to the junction between isolating diodes 33 and 34. Similarly, the negative-going pulse sample at the output of cathode follower 29 is applied via capacitor 35 to the junction between isolating diodes 36 and 37. Isolating diodes 33, 34, 36 and 37 are connected in series circuit and poled for current flow in the same direction between terminals 38 and 39. Back biases opposing the flow of current through the isolating diodes are applied to terminals 38 and 39.

The junction between diodes 34 and 36 is directly coupled to the grid of a conventional cathode coupled amplifier 40. The output plate of amplifier 40 is directly coupled to D.C. amplifier 41. The output of amplifier 41 is coupled via cathode follower 42 to output line 31 and to a first side of feedback capacitor 44. The other side of feedback capacitor 44 is coupled to the input grid of amplifier 40. As will be recognized by those skilled in the art, amplifiers 40 and 41, cathode follower 42, and feedback capacitor 44 together comprise a conventional integrator.

In operation, the negative pulse sample applied to capacitor 32 flows through diode 33 into the negative supply after overcoming the small back bias applied to terminal 38. The flow of current through diode 33 charges coupling capacitor 32. Upon the termination of the pulse sample, charged capacitor 32 discharges into feedback capacitor 44 via diode 34 placing a charge on feedback capacitor 44 related to the amplitude of the pulse sample applied to capacitor 32. The negative pulse sample applied to capacitor 35 flows through diode 36 and into feedback capacitor 44 in a direction opposite to that taken by the discharging current of capacitor 32. The resulting net charge on feedback capacitor 44 is related to the difference in amplitudes between the negative pulse samples applied to capacitors 33 and 35. The charge resulting on capacitor 35 from the application of the negative pulse sample is discharged, following the termination of the pulse sample, via diode 37 after overcoming the small back bias applied to terminal 39. The essentially direct potential produced on output line 31 is applied via resistor 43 of FIG. 1 to the input of amplifier 8 of sweep generating circuit 11.

The potential of line 31 at the output of differential pulse integrator 30 modifies the slope of the sweep waveform produced by generator 11 in accordance with the following expression $$-\frac{de_0}{dt} = \frac{\text{potential at terminal 9}}{R_{10}C_7} + \frac{\text{potential of line 31}}{R_{43}C_7}$$

The last term of the above expression compensates for any change in slope of the sweep waveform produced by generator 11 irrespective of the cause thereof, e.g., temperature variation or aging. The slope of the generated sweep waveform thus is maintained at that predetermined value which causes crossover point 22 of FIG. 2A to occur substantially at the same time as sampling pulse B following the initiation of the sweep waveform.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. Apparatus comprising a sweep generator for producing a linear sweep voltage having a slope responsive to the amplitude and polarity of a compensating signal, a source of fixed amplitude reference voltage, actuable voltage comparison means for producing when actuated an output signal having an amplitude proportional to the difference between the amplitudes of first and second input signals and having a polarity representing the sense of said difference, said sweep voltage and said reference voltage being applied to said comparison means as said first and second input signals, respectively, triggering means for actuating said sweep generator, means coupled to said triggering means for producing a control pulse at a predetermined time following the actuation of said sweep generator, said control pulse being applied to said comparison means for actuating said comparison means, and means for applying said output signal as said compensating signal to said sweep generator.

2. Apparatus comprising a sweep generator, said sweep generator including means for producing a linear sweep voltage having a slope responsive to the amplitude and polarity of a compensating signal, a source of fixed amplitude reference voltage, actuable voltage comparison means for producing when actuated an output signal having an amplitude proportional to the difference between the amplitudes of first and second input signals and having a polarity representing the sense of said difference, said sweep voltage and said reference voltage being applied to said comparison means as said first and second input signals, respectively, means responsive to trigger pulses for actuating said sweep generator to produce said sweep voltage, pulse delay means having an output coupled to said comparison means and having an input coupled to receive said trigger pulses, said comparison means being atuated by the delayed trigger pulses at the output of said delay means, and means for applying said output signal to said sweep generator as said compensating signal.

3. A self-regulating sweep generator comprising means for producing a linear sweep voltage having a slope responsive to the amplitude and polarity of a compensating signal, a voltage amplitude comparator, a source of fixed amplitude reference voltage, said sweep voltage and said reference voltage being applied to said comparator, said comparator producing across a pair of output terminals a first output signal having an amplitude proportional to the difference between the amplitudes of said sweep voltage and said reference voltage and having a polarity representing the sense of said difference, triggering means for actuating said means for producing said sweep voltage, means coupled to said triggering means for generating a sampling pulse at a predetermined time following the actuation of said means for producing said sweep voltage, sampling gate means coupled to the output terminals of said comparator and to said means for generating said sampling pulse, said sampling gate means being actuated by said sampling pulse to produce a second output signal having an amplitude and polarity related to those of said first output signal at the time of occurrence of said sampling pulse, and means for applying said second output signal as said compensating signal to said means for producing said sweep voltage.

4. Apparatus comprising a linear sweep voltage generator, said generator including slope determining elements for controlling the slope of the generated sweep voltage in accordance with the amplitude and polarity of an applied compensating signal, a voltage amplitude comparator, a source of fixed amplitude reference voltage, said sweep voltage and said reference voltage being applied to said comparator, said comparator producing across a pair of output terminals a first output signal having an amplitude proportional to the difference between the amplitudes of said sweep voltage and said reference voltage and having a polarity representing the sense of said difference, means responsive to applied trigger pulses for actuating said sweep generator, pulse delay means, said trigger pulses being applied to said pulse delay means, sampling gate means coupled to the output terminals of said comparator and to the output of said delay means, said sampling gate means being actuated by the delayed trigger pulses to produce a second output signal having an amplitude and polarity proportional to those of said first output signal at the time of occurrence of said delayed trigger pulses, and means for applying said second output signal as said compensating signal to said slope determining elements.

5. Apparatus comprising a Miller sweep generator, said generator comprising an amplifier and a capacitor connected across the input and output of said amplifier, said sweep generator producing a linear sweep voltage having a slope responsive to the amplitude and polarity of a compensating signal applied to said input of said amplifier, a voltage amplitude comparator, a source of fixed amplitude reference voltage, said sweep voltage and said reference voltage being applied to said comparator, said comparator producing across a pair of output terminals a first output signal having an amplitude proportional to the difference between the amplitudes of said sweep voltage and said reference voltage and having a polarity representing the sense of said difference, triggering means for actuating said sweep generator, means coupled to said triggering means for generating a sampling pulse at a predetermined time following the actuation of said sweep generator, sampling gate means coupled to the output terminals of said comparator and to said means for generating said sampling pulse, said sampling gate means being actuated by said sampling pulse to produce a second output signal having an amplitude and polarity related to those of said first output signal at the time of occurrence of said sampling pulse, and means for applying said second output signal as said compensating signal to said input of said amplifier.

6. Apparatus as defined in claim 5 wherein said means for applying said second output signal to said input of said amplifier comprises a resistor.

References Cited in the file of this patent
UNITED STATES PATENTS
2,984,788    Korff et al. _____ May 16, 1961